United States Patent
Dinallo et al.

(10) Patent No.: US 9,015,409 B2
(45) Date of Patent: Apr. 21, 2015

(54) APPARATUS AND METHODS FOR PROLONGING SERVICE LIFE OF SOLID-STATE MEMORY DEVICE IN A DIGITAL VIDEO RECORDER

(71) Applicants: Chris Dinallo, Boca Raton, FL (US); Tomasz Kozlowski, Zielona Gora (PL)

(72) Inventors: Chris Dinallo, Boca Raton, FL (US); Tomasz Kozlowski, Zielona Gora (PL)

(73) Assignee: Advanced Digital Broadcast SA, Chambesy (CH)

( * ) Notice: Subject to any disclaimer, the term of this patent is extended or adjusted under 35 U.S.C. 154(b) by 216 days.

(21) Appl. No.: 13/832,863

(22) Filed: Mar. 15, 2013

(65) Prior Publication Data

US 2014/0281213 A1    Sep. 18, 2014

(51) Int. Cl.
*G06F 12/02* (2006.01)
*G06F 3/06* (2006.01)
*G06F 11/00* (2006.01)
*G11B 19/02* (2006.01)
*H04N 5/907* (2006.01)
*H04N 21/4147* (2011.01)
*H04N 21/443* (2011.01)

(52) U.S. Cl.
CPC .............. *G06F 3/0616* (2013.01); *G06F 11/00* (2013.01); *G11B 19/02* (2013.01); *H04N 5/907* (2013.01); *H04N 21/4147* (2013.01); *H04N 21/4435* (2013.01); *G06F 3/0659* (2013.01); *G06F 3/0674* (2013.01)

(58) Field of Classification Search
CPC ... G06F 3/0616; G06F 3/0659; G06F 3/0674; G11B 19/02; H04N 21/4147
USPC .............. 711/112, 103, 154, 156; 365/185.33
See application file for complete search history.

(56) References Cited

U.S. PATENT DOCUMENTS

| | | | | |
|---|---|---|---|---|
| 7,970,919 B1* | 6/2011 | Duran | ............. | 709/230 |
| 8,090,899 B1* | 1/2012 | Syu | ................. | 711/103 |
| 8,200,888 B2* | 6/2012 | Simonson | ........ | 711/103 |
| 8,271,692 B1* | 9/2012 | Dinh et al. | ........ | 710/5 |
| 8,364,888 B2* | 1/2013 | Melik-Martirosian et al. | ........ | 711/103 |
| 8,402,152 B2* | 3/2013 | Duran | ............. | 709/230 |
| 8,464,309 B2* | 6/2013 | Barton | ............. | 725/134 |
| 8,578,089 B2* | 11/2013 | Watts et al. | ........ | 711/113 |
| 8,634,703 B1* | 1/2014 | Barton | ............. | 386/261 |
| 8,738,846 B2* | 5/2014 | Son et al. | ........ | 711/103 |
| 8,862,810 B2* | 10/2014 | Lee et al. | ........ | 711/103 |
| 8,924,628 B2* | 12/2014 | Kim | ............. | 711/103 |
| 2012/0239858 A1* | 9/2012 | Melik-Martirosian | ....... | 711/103 |
| 2012/0239991 A1* | 9/2012 | Melik-Martirosian | ....... | 714/708 |
| 2012/0311237 A1* | 12/2012 | Park | ............. | 711/103 |
| 2013/0124792 A1* | 5/2013 | Melik-Martirosian et al. | ........ | 711/103 |
| 2013/0132647 A1* | 5/2013 | Melik-Martirosian | ....... | 711/103 |
| 2013/0185482 A1* | 7/2013 | Kim et al. | ........ | 711/103 |
| 2013/0185487 A1* | 7/2013 | Kim et al. | ........ | 711/103 |
| 2013/0232296 A1* | 9/2013 | Yonezawa et al. | ........ | 711/103 |
| 2014/0112638 A1* | 4/2014 | Nguyen | ........ | 386/231 |

* cited by examiner

*Primary Examiner* — Stephen Elmore
(74) *Attorney, Agent, or Firm* — Greenberg Traurig, LLP; Chinh H. Pham

(57) ABSTRACT

A method for prolonging the service life of a solid state drive. The method includes providing for use with a digital video recorder, a solid state drive (SSD) for time-shifted viewing of media content, changing the SSD from a first state to a second state based on a functional command from the user, and repeating changes between the first state and the second state, an accumulation of which over time results in a prolonged service life. A device designed to prolong the service life of a solid state drive is also provided.

20 Claims, 5 Drawing Sheets

APPARATUS AND METHODS FOR PROLONGING SERVICE LIFE OF SOLID-STATE MEMORY DEVICE IN A DIGITAL VIDEO RECORDER

FIELD OF DISCLOSURE

The current disclosure relates to digital video recorders, more particularly, to digital video recorders designed to prolong service life of solid-state memory devices, for use herewith.

BACKGROUND

A digital video recorder (DVR) is an electronic device or application software that records video or other media content in a digital format to a storage device for playback to a user in a time-shifted manner. Such digital video recorder may be embodied in a device (e.g. a set-top box, or a set-back box) connected to a television set, in circuitry built-in with a television set, or simply be a software application being executed on a computer.

At present, a conventional DVR continually records live broadcast or scheduled video programs to its internal hard disk drive ("HDD"). The programs being recorded typically correspond to the channels to which the internal tuner or tuners of the DVR are tuned. This constant recording operation to the HDD enables the user to perform time-shifted viewing and other associated time-shifting functions in connection with the recorded media content. Furthermore, the time-shifted viewing may be provided instantaneously to the user as the program is broadcasted or otherwise transmitted to the DVR. In particular, a user can perform the time-shifting functions before the entire program has been recorded. These time-shifting operations include: pause, resume, and play back of video content at various search speeds of backward play and forward play.

For a conventional DVR, the recording operation is performed regardless of whether the user is viewing any of the recorded or live-broadcast content. In fact, most DVR set-tops remain in a standby mode and continue to record content even when the user selects the power-off button. In particular, conventional DVR set-tops implement the continuous recording operations in circular recording buffers, also known as "circular buffers", on a fixed-size portion of the HDD. When the fixed-size portion gets full, the DVR continues recording by "circling" back to an earlier recorded portion of the recording buffer and overwrites the earlier recorded content, hence the term "circular buffer." Since the conventional DVR records over the same physical storage medium repeatedly over time, the storage medium may be subject to wear.

A conventional DVR implemented with a HDD can enjoy a relatively longer service life than a conventional DVR implemented with, for instance, a solid state drive (SSD). This is because the magnetic storage media in HDD has a relatively longer service life in terms of write cycles. For example, a typical SSD only has a service of approximately 100,000 write cycles. For recording high-definition programs on a 1-hour circular buffer, a SSD will wear out in a little over one year. Although there are SSD life-extending techniques such as "wear-leveling" (techniques to spread the write operation over all of the available SSD), the bottom line is that SSD still has a limited life-span regardless of its capacity because data is written to the entire SSD over time.

It should also be noted that if the SSD size is increased to compensate for better wear-leveling, such an increase can result in a cost increase that reduces the main benefit of using a less expensive SDD over a HDD for circular buffering.

Therefore, it is desirable to construct DVR with the less expensive SSD as long as the problem of wear is addressed.

SUMMARY OF THE INVENTION

According to an embodiment of the present invention, there is provided a method for prolonging service life of a solid state drive. The method includes, in the embodiment, providing, for use with a digital video recorder, a solid state drive (SSD) for time-shifted viewing of media content. The method also permits, in the embodiment, changing the SSD from a first state to a second state based on a functional command from the user, and repeating changes between the first state and the second state, an accumulation of which over time results in a prolonged service life.

According to another embodiment of the present invention, there is provided a digital recording device. The digital recording device includes a receiver for receiving media contents, a solid state device (SSD) in operational communication with the receiver and being designed to operate between a first state and a second state, and a storage controller for changing the SSD from the first state to the second state based on a functional command from the user, the result of which over time prolongs a service life of the SSD.

According to another embodiment of the present invention, there is provided a digital recording apparatus having a solid state device (SSD) configured to buffer media content for a user, a controller, and a non-transitory computer readable storage medium for storing a computer-readable program thereon. When executed by the controller, the program causes the digital recording apparatus to prolong service life of the SSD. The program includes instruction steps for controlling the SSD to perform a reading operation for providing time-shifted viewing of media content to the user, the SSD being in a first state, changing the SSD from the a first state to a second state based on a functional command from the user, and repeating changes between the first state and the second state, an accumulation of which over time results in a prolonged service life.

According to another embodiment of the present invention, there is provided a solid state drive (SSD) for providing a time-shifted content output. The SSD includes a detector configured to detect a signal in connection with a functional command from a user, and a controller configured to change the SSD from a first non-recording state to a second recording state based on the functional command from the user, and to change the SSD from the second state back to the first state after a predetermined duration. The controller repeats the changes between the first state and the second state, an accumulation of which over time results in the SSD having a prolonged service life.

According to another embodiment of the present invention, there is provided a solid state drive (SSD) for providing a time-shifted content output. The SSD includes a detector configured to detect a signal in connection with a functional command from a user, and a controller configured to change the SSD from a first recording state to a second non-recording state based on the functional command from the user. The controller repeats the changes between the first state and the second state, an accumulation of which over time results in the SSD having a prolonged service life.

DETAILED DESCRIPTION

Figure 1:
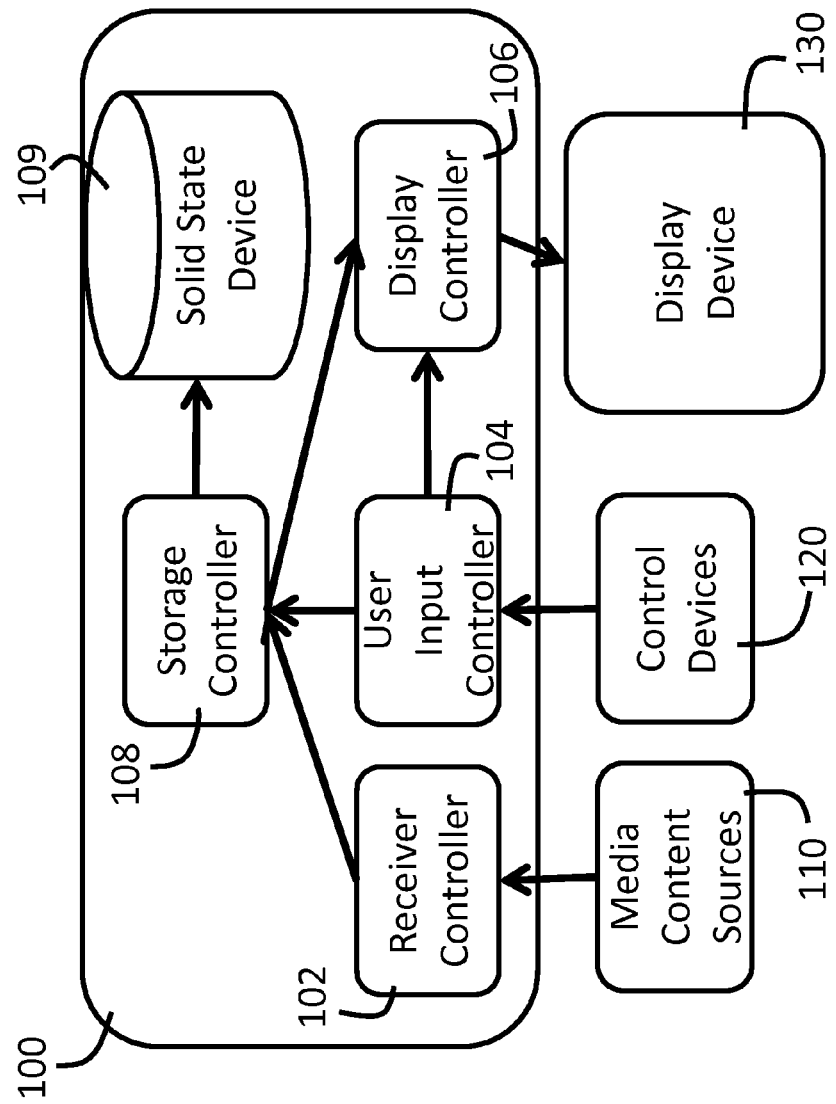
FIG. 1 depicts a digital video recorder for prolonging service life of a solid state drive, according to an embodiment of the present invention.

FIG. 1 depicts a digital video recorder (DVR) 100 having components designed to perform various methods for prolonging the service life of a solid state drive (SSD) 109, according to embodiments of the present invention. As discussed below, with respect to various embodiments of the present invention, the service life of the SSD 109 can be prolonged by aligning the service life of the SSD 109 with actual user viewing experiences. The actual viewing experience of the user can be detected or inferred from various user commands and actions. The scope of the present invention should not be limited to the specific user actions or commands discussed herein.

The DVR 100, as depicted, can include, in an embodiment, a SSD 109, a storage controller 108, and a receiver controller 102 for receiving digital media contents from a plurality of media content sources 11. The storage controller 108 can be designed to control the SSD 109 to store digital media contents received by the receiver controller 102 according to the methods in various embodiments of the present invention. In particular, according to an embodiment, the storage controller 108 can change the SSD from a first state of operation to a second state of operation based on a functional command from the user. Subsequently, according to an embodiment, the storage controller 108 can change the SSD from the second state of operation back to the first state of operation based on another functional command from the user, or after a predetermined duration. For example, in a first state of operation, the SSD 109 can be controlled to perform a recording operation in which received media content is recorded on the SSD 109, while in a second state of operation, the SSD 109 can be controlled to perform a non-recording operation in which received media content is not recorded on the SSD 109. As will be discussed further below, the storage controller 108, according to an embodiment of the present inventions, can change the SSD 109 from the first state to the second state so as to stop the recording operation in circumstances determined, according to an embodiment, to permit prolonging of the service life of the SSD 109.

Alternatively, in another example, the SSD 109 may perform a non-recording operation in a first state and a recording operation in a second state, and the storage controller 108 can change the SSD 109 from a non-recording operational state to a recording operational state. In this second example, the SSD 109 may remain in the non-recording operational state so as to preserve the service life of the SSD 109, until it is determined, according to another embodiment, that a recording operational state is required to satisfy a user command.

Over time, the changing of the SSD 109 between the first and second states of operation minimizes the continuous recording, which continuous recording is typically observed in a conventional DVR, and can prolong the service life of the SSD 109. In particular, according to various embodiments of the present invention, the finite number of write cycles of the SSD 109 is allocated according to whether the circular buffering of media content actually benefits the viewing experience of the user. Accordingly, in various embodiments, the SSD 109 can be changed from a non-recording operational state to a recording operational state when it can be determined that the recording operation benefits the user experience, and alternately, the SSD 109 can be changed to a non-recording state when it can be determined that the recording operation no longer benefits the user experience, e.g. when the user has abandoned a time-shifted viewing.

The DVR 100 can further include, in one embodiment, a user input controller 104 for receiving user commands from a plurality of control devices 120. The plurality of control devices 120, in an embodiment, may include a remote control device. The DVR 100 may further include, in an embodiment, a display controller 106 for displaying content on a display device 130. The displayed content may include live-broadcast or transmitted media content and a graphical user interface. When used by the user in connection with the control device 120, the display device 130 may provide information through the graphical user interface to the user, while the control device 120 may receive commands from the user, and the display controller 106 may provide display content to the display device 130 according to the received commands.

According to another embodiment, the DVR 100 can further include a non-transitory computer readable storage medium for storing a computer-readable program. The program can include a set of instruction steps for execution by the controller 108, and execution of the program by the controller 108 causes the DVR 100 to prolong the service life of the SSD 109. According to an embodiment, the program includes controlling the SSD to perform a reading operation for providing time-shifted viewing of media content to user, the SSD being in a first state, changing the SSD from the first state to a second state based on a functional command from the user, and repeating changes between the first state and the second state, an accumulation of which over time results in a prolonged service life.

Although the embodiments above describes various controllers, it should be understood that the controllers 102, 104, 106, and 108 can be implemented in one general purpose microcontroller or processor, or a number of microcontrollers or processors.

Align SSD Service Life with User Commands for Time-Shifted Content

According to an embodiment of the present invention, the storage controller 108 can change the SSD 109 from a first state of operation to a second state of operation and subsequently change the SSD 109 from the second state back to the first state, so as to align the service life of the SSD 109 closely with user commands of time-shifting functions. Here, the SSD 109 can perform non-recording operations in the first state and recording operations in the second state.

Figure 2:
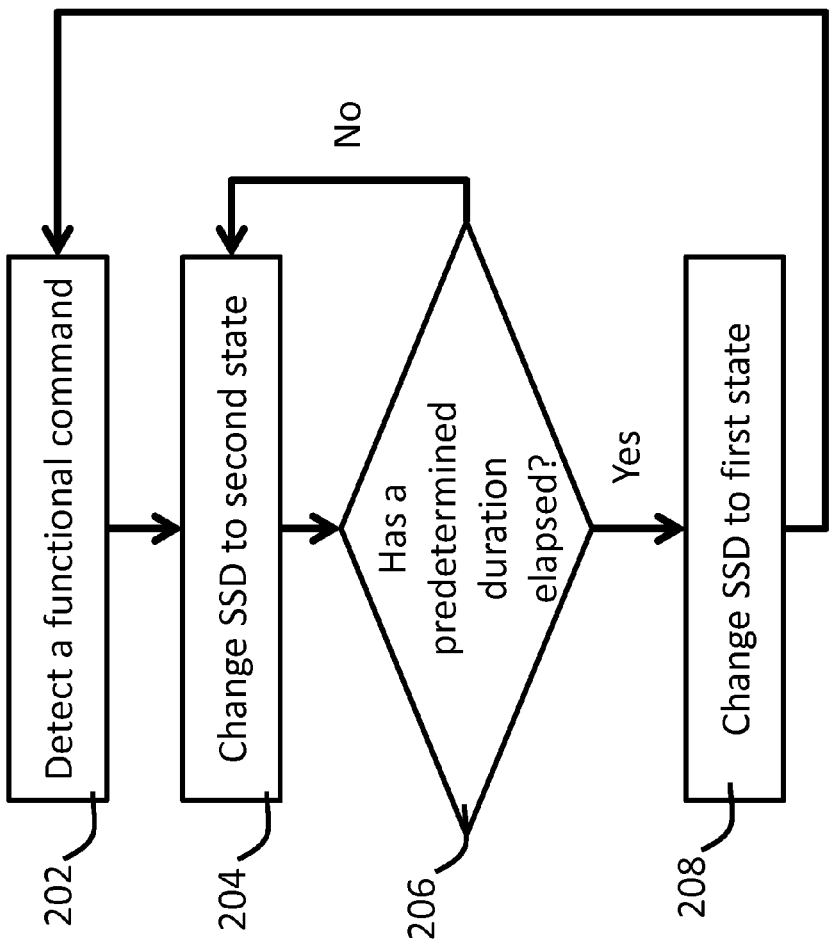
FIG. 2 depicts a method for prolonging service life of a solid state drive, according to an embodiment.

FIG. 2 depicts one method for prolonging the service of a SSD 109 in a DVR 100 according to this embodiment of the present invention. In this approach, prior to step 202, the SSD 109 may be in a first state of operation where it does not record received media contents that is being output to display device 130. In step 202, the user input controller 104 receives a control signal from control device 120 and detects that the user has issued a functional command to be performed on the media content received by receiver controller 102. For example, the user may issue a functional command of a pause in the display of contents on display device 130.

In response to the command, in step 204, the storage controller 108 can change the SSD 109 to a second state of operation where it can begin to record the received media contents. Also in response to the command, the display controller 106 can control the display device 130 to pause or freeze the media content displayed. The recording of the received media content in the second state of the SSD allows the user to subsequently issue a functional command to resume viewing of the recorded content and fast forward at various search speeds to another point in time in the media content subsequent to when the recording began. According to this embodiment, user also can rewind to the point in time when the recording began, thus saves the SSD 109 from continuously recording before the user has requested a function command to perform a time-shifting to the received media content, thereby prolonging its service life.

Further according to this embodiment of the present invention, in steps 206 and 208, the storage controller 108 can change the SSD 109 from the second state of operation back to the first state of operation, which terminates the recording of media content, after a predetermined duration has elapsed.

The predetermined duration, in one embodiment, may be set according to a number of time periods. As a first example, the predetermined duration may be set to the duration of a television program, the content of which is being viewed. A second example may be to set to the duration of a typical television program (1-2 hours). In these two examples, by changing the SSD 109 from a recording state to a non-recording state at the end of a television program, the DVR no longer continuously records media content to the SSD 109. This approach can prolong the service of the SSD 109 because these settings do not assume that the user will continue to view subsequent television programs, which may unnecessarily require the SSD 109 to operate in a recording state.

Figure 5:
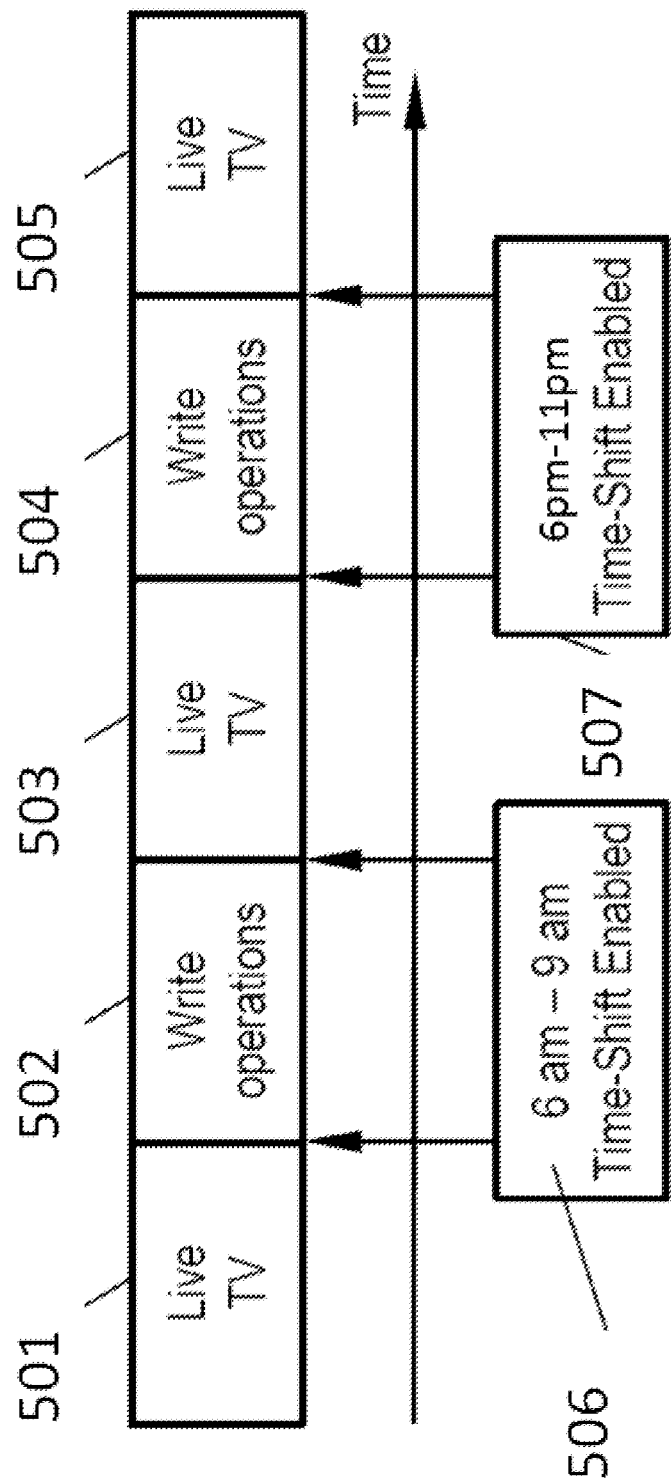
FIG. 5 depicts a program recording timing diagram according to an embodiment.

A third example may be a user-selected duration. This duration may be specified by the user as a duration after the commencement of recording operations performed by the SSD 109, or it may be specified by the user as a plurality of start and stop times, as shown in FIG. 5. In this example, media content may be recorded to the SSD 109 only during user specified times. In a more specific example, the user may want to specify DVR time-shift 8 hours a day because the user only watches TV programs scheduled to occur in that time period. The time periods do not have to be contiguous. For example, the periods can be for 6 am-9 am and 6 pm-11 pm, shown as time-shift enabled durations 506 and 507 in FIG. 5. Accordingly, the DVR 100 can output live TV to the display device 130 during time blocks 501, 503, and 505, where the SSD remains in a non-recording state of operation.

Also, during time blocks 502 and 504, the storage controller 108 changes SSD 109 to record the media content received by the receiver controller 102, such that DVR 100 can provide time-shifted viewing of the recorded media content.

Over time, preventing the SSD 109 from having media content recorded over and over prolongs its service life. In other words, although SSD 109 can perform recording operations continuously, much like a conventional HHD circular buffer, by actively controlling to change the operational state of the SSD 109 according the embodiments of the present invention, the service life of the SSD 109 becomes better aligned with the viewing experience of the user, and the DVR provides more economic value over its service life. In one aspect, by aligning the changes in the operational states of the SSD 109, in one sense, affords the user more direct controls of the operational states of the SSD 109, which may provide the user a better viewing experience. In another aspect, the advantage in this example is that the SSD service life may be extended to nearly 7 years (versus approximately 1.15 years if recording occurred continuously). Not only is 8 hours a day a realistic and practical time-period for the vast population of TV viewers, it provides a service life that aligns well with TV operators whom amortize their set-top purchases over a 7 year asset life.

A fourth example may be to set to the predetermined duration to correspond to the storage capacity of the SSD. In any case, by changing the state of the SSD 109 after the predetermined duration to terminate the recording operation prolongs the service life of the SSD 109 by preventing continuous write operations that are unnecessarily extended to unviewed content.

Further according to this embodiment, the DVR 100 of the present invention can be designed to detect a functional command from the user when the DVR 100 is not recording media content on the SSD 109, to permit changing of the SSD from one state to another state in connection with a change in the viewing experience commanded by the users. In particular, the detection of user command for the purpose of changing the operational state of the SSD occurs when the SSD 109 is in the non-recording state. This may be preferable over other current DVR approaches in which the detection of user commands occurs during a SSD recording state, which results in continued recording until an absence of a user command after a predetermined duration. Specifically, other current DVR approaches may "time-out" after a period of user inactivity. Thus if the user inputs a time-shift function request shortly after the "time-out," these current approaches may cause unnecessary switches in the operational state of the SSD, resulting in excessive wear.

Unlike these current approaches, the DVR 100 of the present invention can be designed to avoid a "time-out" scenario. In doing so, the DVR 100 can avoid unnecessary or excessive changes to the states of the SSD 109 and the DVR 100 can be more responsive to other functional commands from the user. Consequently, if the user wishes to continue to perform a time-shifted viewing of media content after the recording operation has been terminated, the user can simply issue another time-shift function command, i.e. user can request pause again or any other time-shifting function. Here, the user experience is substantially preserved, while the service life of the SSD is prolonged.

Timely Preserving Service Life after User Abandons Time-Shifted Content

According to another embodiment of the present invention, the DVR 100 can change the SSD 109 from a first recording state of operation to a second non-recording state of operation so as to timely preserve service life of the SSD 109 after user abandons time-shifted contents.

Figure 3:
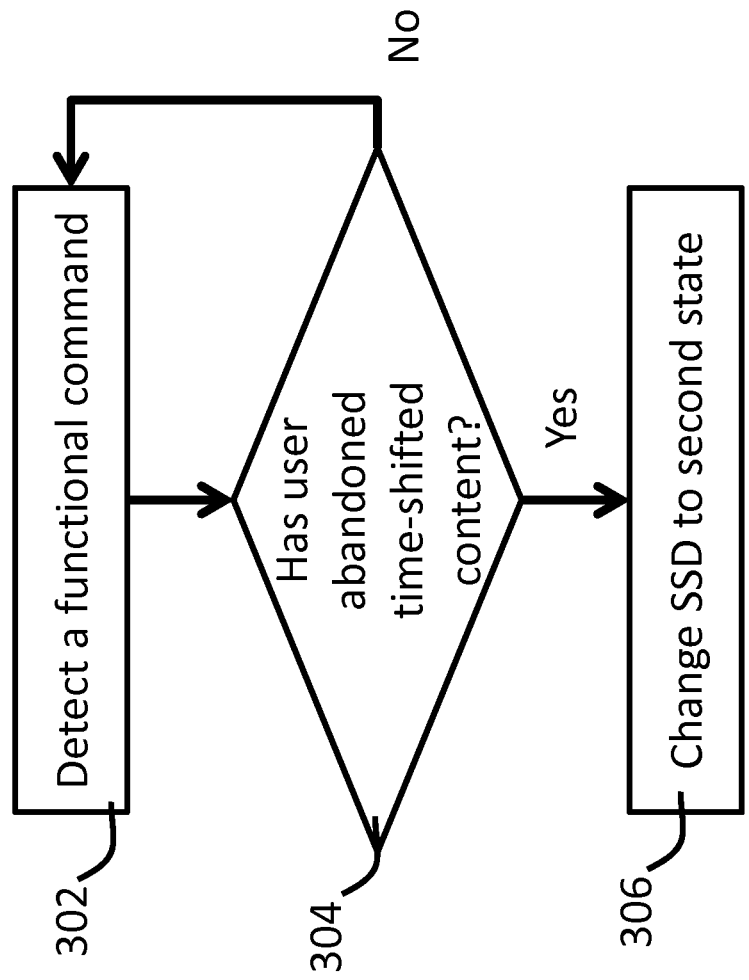
FIG. 3 depicts a method for prolonging service life of a solid state drive, according to another embodiment.

According to this embodiment of the present invention, as shown in FIG. 3, while the SSD 109 is in a first state of operation in which the SSD 109 records received media content, the DVR 100 detects a functional command from the user to abandon the time-shifting function. In response to the functional command, the SSD 109 is changed to a second state which terminates the recording operation. In one embodiment, prior to step 302, the SSD 109 can perform recording operations in a first state of operation. In step 302, the DVR 100 detects a user function command to perform a live-viewing function or a time-shifting function. Subsequently, in step 304, it is determined whether the functional command from the user may indicate that the user wishes to abandon the time-shift function performed over the currently stored content, i.e. abandon the currently time-shifted content. The functional command can be any of a channel change, an advance of viewing time to currently broadcasted content received by receiver controller 102 (live viewing), or a switch to place the DVR 100 in a standby mode. In response, in step 306, the storage controller 108 changes the SSD 109 to the second state so as to terminate its recording operation. Here, the method according to this embodiment prolongs the service of the SSD because it saves the SSD 109 from performing recording operations after the user has abandoned the time-shifted content, which indicates that further recording operations are no longer beneficial to the user experience.

It should be understood that other user commands, in addition to a channel change and an advance of viewing time to live viewing, can be detect so as to determine whether the functional command from the user may indicate that the user wishes to abandon the time-shift time-shifted content. Also, the above embodiment has described a DVR 100 have one SSD 109 and one receiver controller 102. Additional receiver controllers and SSD's, of course, can be provided so that the DVR 100 can perform recording of media content received from multiple channels. In such embodiment, detection and subsequent determination of user command to abandon time-shifted content can be perform for each of the channels and their associated SSD.

Similar to the embodiments that align the service life of the SSD with user commands for time-shifted content, where the user is permitted to initiate a SSD recording operation with a time-shift function command, here, a user command determined to indicate that the user abandons the time-shifted content permits the user to terminate a SSD recording operation. The user is afforded more direct controls over the SSD recording operations and the user viewing experience is not unnecessarily burdened.

Align SSD Service Life with Active Viewing by User

According to another embodiment of the present invention, the DVR 100 can change the SSD 109 from a first non-recording state of operation to a second recording state of operation and subsequently change the SSD 109 from the second state back to the first state so as to align the service life of the SSD 109 closely with actively viewing by user.

Figure 4:
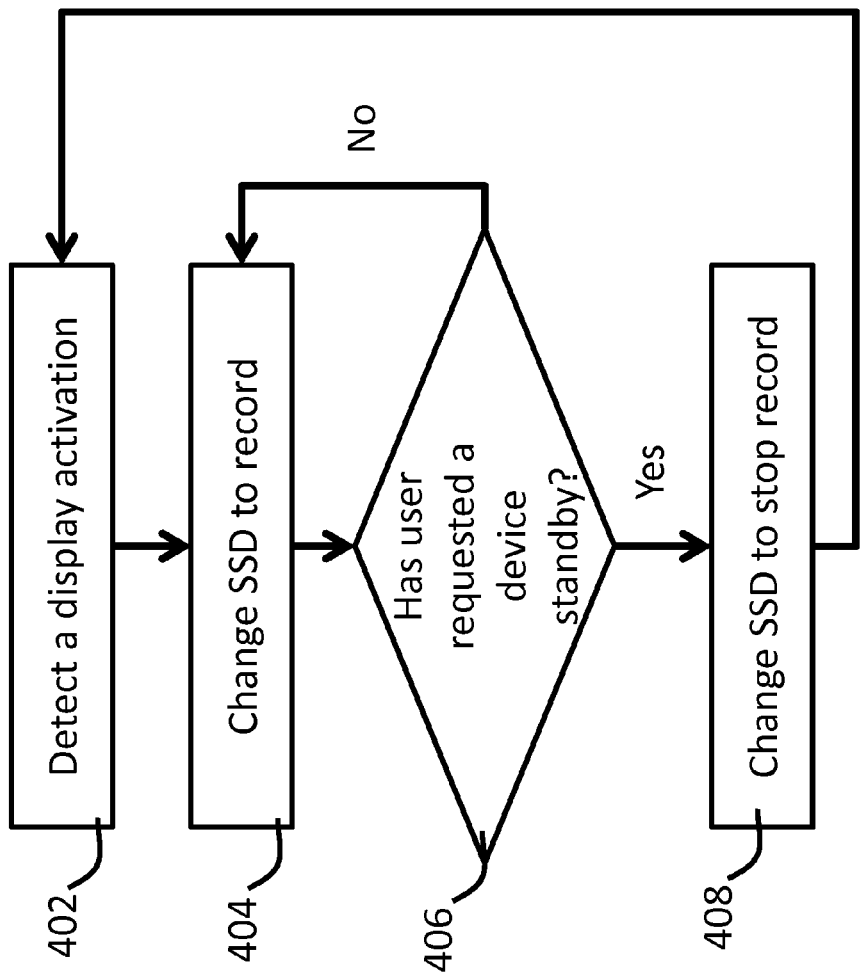
FIG. 4 depicts a method for prolonging service life of a solid state drive, according to another embodiment.

According to this embodiment of the present invention, as shown in FIG. 4, the DVR 100 may instruct the SSD 109 to begin a recording operation of media content in response to a user command to activate the DVR 100, and may instruct the SSD 109 to terminate the recording operation in response to a user command to place the DVR 100 in a standby mode. In particular, in step 402, the user input controller 104 detects a control signal from the control device 120 indicating that a user has issued an activation command, the display controller 106 controls the display device 130 to display media content received by the receiver controller 102. Further in response to the activation, in step 404, the storage controller 108 controls the SSD 109 to begin recording the received media content. At this point, the user may select any of the time-shifting functions to be performed on the received media content.

Subsequently, in step 406, the user input controller 104 may receive a control signal from the control device 110 that indicates the user commands to place the DVR in a standby mode, or receive a control signal from the control device 110 that is reflective of the user commands to terminate the output to display device 130. Alternatively, the display controller 106 may receive a control signal from the display device that the user has switched off the display device 130. In response, in step 408, the storage controller 108 controls SSD 109 to terminate the recording operation. Similar to other embodiments, the method according to this embodiment prolongs the service life of the SSD by performing the recording operation only when the user is actively viewing live-broadcast or time-shifted media content.

In should be understood that the above embodiments can be implemented in a SSD device that can be used in, or connected to a digital video recorder to enable the DVR to output time-shifted content while practicing the various methods to prolong the service life of the SSD. In one such embodiment, a SSD can be provided with a detector configured to detect a signal in connection with a functional command from a user, and a controller configured to change the SSD from a first non-recording state to a second recording state based on the functional command from the user, and to change the SSD from the second state back to the first state after a predetermined duration. The controller can repeat the changes between the first state and the second state, an accumulation of which over time results in the SSD having a prolonged service life. In another such embodiment, a SSD can be provided with a detector configured to detect a signal in connection with a functional command from a user, and a controller configured to change the SSD from a first recording state to a second non-recording state based on the functional command from the user. The controller can repeat the changes between the first state and the second state, an accumulation of which over time results in the SSD having a prolonged service life.

Also, the above embodiments of present invention can be practice in various combinations with one another or with other modifications within the scope of the present invention. In all, these embodiment better preserves and prolongs the service life of a solid state memory device that is configured to provide a circular recording buffer in a digital recording device. According to the various embodiments, the user is afforded, in a sense, more direct controls over the recording operations of the SSD, i.e., the user commands more directly affects the operational states of the SSD. In particular, when the service life of the SSD can be better aligned with the viewing experience of the user as a result of practicing the embodiments of the present invention, the result is that the digital recording device, i.e. DVR, provides more economic value over its life for consumers and manufacturers.

While the invention has been described in connection with specific embodiments, it will be understood that it is capable of further modification. Furthermore, this application is intended to cover any variations, uses, or adaptations of the invention, including such departures from the present disclosure as come within known or customary practice in the art to which the invention pertains.

What is claimed is:

1. A method for prolonging service life of a solid state drive, the method comprising:
   providing, for use with a digital video recorder, a solid state drive (SSD) for time-shifted viewing of media content;
   changing the SSD from a first state to a second state based on a functional command from the user; and
   repeating changes between the first state and the second state, an accumulation of which over time results in a prolonged service life.

2. The method of claim 1, wherein in the step of changing, when the SSD performs a recording operation in the first state and a non-recording operation in the second state, the functional command from the user includes one of:
   change channel,
   advance to live viewing, or
   switch to standby.

3. The method of claim 1, wherein in the step of changing, when the SSD performs a non-recording operation in the first state and a recording operation in the second state, the functional command from the user includes one of:
   pause/resume,
   forwards play at various search speeds, or
   backwards play at various search speeds.

4. The method of claim 1, further comprising:
   changing the SSD from the second state back to the first state after a predetermined duration, the predetermined duration includes one of a program length, a user specified duration, or a duration that corresponds to the SSD capacity;

wherein the SSD performs a non-recording operation in the first state and a recording operation in the second state.

5. The method of claim 1, further comprising:

changing the SSD from the second state back to the first state after a predetermined duration, the predetermined duration being determined by a user-specified duration;

wherein in the step of changing the SSD from the first state to a second state based on a functional command from the user, the SSD performs a non-recording operation in the first state and a recording operation in the second state, and the functional command includes a start time for the user-specified duration.

6. The method of claim 1, further comprising:

changing the SSD from the second state back to the first state after another functional command from the user, the another functional command being one of a command to terminate display output and a command to switch to standby, wherein in the step of changing the SSD from the first state to a second state based on a functional command from the user, the SSD performs a non-recording operation in the first state and a recording operation in the second state, and the functional command from the user is one of a command to output media content to a display device and a DVR activation.

7. A digital recording device comprising:

a receiver for receiving media contents;

a solid state device (SSD) in operational communication with the receiver and being designed to operate between a first state and a second state;

a storage controller for changing the SSD from the first state to the second state based on a functional command from the user, the result of which over time prolongs a service life of the SSD.

8. The digital recording device of claim 7, wherein the SSD performs a recording operation on received media content in the first state and a non-recording operation in the second state, and the storage controller changes the SSD from the first state to the second state based on one of the following functional commands from user:

change channel, advance to live viewing, or switch to standby.

9. The digital recording device of claim 7, wherein the SSD performs a non-recording operation in the first state and a recording operation on received media content in the second state, and the storage controller changes the SSD from the first state to the second state based one of the following functional commands from user:

pause/resume, forwards play at various search speeds, or backwards play at various search speeds.

10. The digital recording device of claim 7, wherein the SSD performs a non-recording operation in the first state and a recording operation on received media content in the second state, and the storage controller changes the SSD from the second state back to the first state after a predetermined duration, the predetermined duration being one of a program length, a user specified duration, or a duration that corresponds to the SSD capacity.

11. The digital recording device of claim 7, wherein the SSD performs a non-recording operation in the first state and a recording operation on received media content in the second state, and the storage controller changes the SSD from the second state back to the first state after a predetermined duration, the predetermined duration being determined by a user specified start time and stop time.

12. The digital recording device of claim 7, wherein the SSD performs a non-recording operation in the first state and a recording operation on received media content in the second state, and the storage controller changes the SSD from the first state to the second state based a functional command from the user, the functional command being a command to output media content to a display device, and the storage controller changes the SSD from the second state back to the first state, based on another functional command, the another command being a command that switches the digital recording device to standby or terminates display output.

13. A digital recording apparatus having a solid state device (SSD) configured to buffer media content for a user, a controller, and a non-transitory computer readable storage medium for storing a computer-readable program thereon, the program when executed by the controller causes the digital recording apparatus to prolong service life of the SSD, the program comprising instruction steps for:

controlling the SSD to perform a reading operation for providing time-shifted viewing of media content to the user;

changing the SSD from a first state to a second state based on a functional command from the user;

repeating changes between the first state and the second state, an accumulation of which over time results in a prolonged service life.

14. The storage medium of claim 13, wherein in the program stored thereon, the SSD is instructed to perform a non-recording operation in the first state and a recording operation in the second state, and the functional command from the user includes one of:

pause/resume, forwards play at various search speeds, or backwards play at various search speeds.

15. The storage medium of claim 13, wherein in the program stored thereon further comprises:

changing the SSD from the second state back to the first state after a predetermined duration, the predetermined duration being one of a program length, a user specified duration, or a duration that corresponds to the SSD capacity;

wherein the SSD is instructed to perform a non-recording operation in the first state and a recording operation in the second state.

16. The storage medium of claim 13, wherein in the program stored thereon further comprises:

changing the SSD from the second state back to the first state after a predetermined duration, the predetermined duration being determined by a user-specified duration;

wherein in the step of changing the SSD from the first state to a second state based on a functional command from the user, the functional command being a start time for the user-specified duration, and the SSD is instructed to perform a non-recording operation in the first state and a recording operation in the second state.

17. The storage medium of claim 13, wherein in the program stored thereon, the SSD is instructed to perform recording operation in the first state and a non-recording operation in the second state, and the functional command from the user includes one of:

change channel, advance to live viewing, or switch to standby.

18. The storage medium of claim 13, wherein in the program stored thereon further comprises:
changing the SSD from the second state back to the first state after another functional command from the user, the another functional command being one of a command to terminate display output and a command to switch to standby,
wherein in the step of changing the SSD from the first state to a second state based on a functional command from the user, the SSD is instructed to perform a non-recording function in the first state and the SSD is instructed to perform a recording function in the second state, and the functional command from the user is a command to output media content to a display device.

19. A solid state drive (SSD) for use in a DVR to provide a time-shifted content output, the SSD comprising:
a detector configured to detect a signal in connection with a functional command from a user;
a controller configured (i) to change the SSD from a first non-recording state to a second recording state based on the functional command from the user, (ii) to change the SSD from the second state back to the first state after a predetermined duration, and (iii) to repeat the changes between the first state and the second state, an accumulation of which over time results in the SSD having a prolonged service life.

20. A solid state drive (SSD) for use in a DVR to provide a time-shifted content output, the SSD comprising:
a detector configured to detect a signal in connection with a functional command from a user;
a controller configured (i) to change the SSD from a first recording state to a second non-recording state based on the functional command from the user, and (ii) to repeat the changes between the first state and the second state, an accumulation of which over time results in the SSD having a prolonged service life.

* * * * *